Patented Mar. 14, 1933                                                    1,901,321

UNITED STATES PATENT OFFICE

FERDINAND MÜNZ, OF FRANKFORT-ON-THE-MAIN-FECHENHEIM, GERMANY, ASSIGNOR TO GENERAL ANILINE WORKS INC., OF NEW YORK, N. Y., A CORPORATION OF DELAWARE

PROCESS FOR RENDERING HARMLESS THE PRECIPITATES FORMED BY HARD WATER

No Drawing. Application filed April 6, 1929, Serial No. 353,272, and in Germany April 17, 1928.

My present invention relates to a process for rendering harmless the precipitates formed by hard water. Such precipitates are, for instance, carbonate of lime which easily separates in washing, dyeing or otherwise treating textile goods, or glutinous and smeary soaps of lime and magnesia, when soaps are used. Furthermore numerous dyestuffs form insoluble compounds with the hardness-producing ingredients of the water applied.

According to my invention these inconveniences of the employment of hard water can be avoided by adding to hard water a derivative of an unsaturated fatty acid or an ester thereof, which contains at least one sulfonic acid group directly linked to a carbon atom. These products are obtained by treating unsaturated fatty acids or esters thereof with sulfur trioxide, advantageously in the form of fuming sulfuric acid. When unsaturated hydroxy fatty acids or their esters are used as starting materials for the production of such sulfonic acid derivatives, it is necessary to raise the quantity of the sulfur trioxide, applied thereto, above one molecule for each molecule of the hydroxy fatty acid used. Advantageously this sulfonating reaction is effected in the presence of a diluent, such as trichloro ethylene, or also in the presence of lower fatty acids or their anhydrides. The products and processes for their production are described in the U. S. Patent No. 1,796,801, dated March 17, 1931.

For the same purpose there are already recommended some fats and oils, especially products of the type of monopol-soap, which latter is a well known commercial soap introduced into industrial use in the year of 1907 as an important improvement of Turkey red oil and having been manufactured, for instance, as follows: 100 parts of castor oil are heated with 30 parts of sulfuric acid of 66° Bé and after standing for some days to 100 parts of the sulfonation product 60 parts of a caustic soda solution of 36° Bé are added. The mass is allowed to stand for some hours and the formed soap is isolated from the separated sodium sulfate and boiled, until a test portion solidifies to a gelatinous mass and shows the characteristics of a soap. But the action of these products is only small and exists only in the special cases of the precipitation of lime soaps. In comparison therewith the sulfonic acid derivatives of oils and fats, which are mentioned above, exhibit a peculiarly good action. Thus they keep dissolved also other insoluble lime compounds, such as carbonate and sulfate of lime.

In order to further illustrate my invention the following examples are given, the parts being by weight and temperatures in Centigrade degrees, but I wish to be understood that my invention is not limited to the examples given, nor to the exact conditions stated therein.

Example 1

1000 parts of water containing 0.125 grs. calcium bicarbonate and 0.125 grs. calcium sulfate are heated to boiling with the addition of 2 parts of the product prepared by the action of 90 to 110 parts of fuming sulfuric acid of 27% strength at about 0° on a mixture of 100 parts of castor oil with 30 to 40 parts of glacial acetic acid and 16 parts of acetic acid anhydride. The water thus prepared remains clear, whereas the water without such admixture separates considerable quantities of carbonate of lime, or of soap of lime when monopol soap is added.

Example 2

1000 parts of the water mentioned in example 1 is mixed with 1 part of the oil prepared by acting at about 0–5° C. with 200 parts of fuming sulfuric acid containing about 27% $SO_3$ on a mixture of 100 parts of castor oil and 125 parts of trichloroethylene and with 1 part of soap of Marseille i. e. the known sodium soap prepared from olive oil dissolved in some hot water.

No soap of lime separates, only a light opalescence occurs not yielding any precipitation, even when standing for several days. In contradistinction therewith products of the type of monopol soap cannot prevent the precipitation of lime soap.

A similar action is obtained by substituting the sulfonated oil by that prepared according to Example 1 by starting from oleic acid, fuming sulfuric acid and trichloroethylene.

*Example 3*

1000 parts of a saturated solution of gypsum are mixed with 5 parts of the oil obtained by acting at a temperature slightly below 0° C. with 70 parts of fuming sulfuric acid containing 66% $SO_3$ on a solution of 100 parts of diricinic acid in 300 parts of carbontetrachloride. The mixture is heated to boiling. The solution remains clear, whereas, without the addition of the oil, gypsum or, in the presence of monopol soap, lime soap is separated.

*Example 4*

10 parts of soap containing 60% of fat are dissolved in 1000 parts of water of 30 German degrees of hardness. To this solution 10 parts of the product prepared by acting with a mixture of 40 parts of glacial acetic acid and of 100 parts of fuming sulfuric acid of 30% strength on 100 parts of castor oil are added and the whole is diluted to 10000 parts by means of the above mentioned hard water. A turbid solution results not containing evident precipitates, whereas without the addition of the sulfonated product a flocculent precipitate of lime soap separates.

I claim:

1. A process which comprises adding to hard water a derivative of an unsaturated fatty acid compound, containing at least one sulfonic acid group directly linked to a carbon atom which is obtainable by acting with fuming sulfuric acid on the unsaturated fatty acid compound.

2. A process which comprises adding to hard water a derivative of an unsaturated hydroxy fatty acid compound, containing at least one sulfonic acid group directly linked to a carbon atom which is obtainable by acting with fuming sulfuric acid on the unsaturated hydroxy fatty compound.

3. A process which comprises adding to hard water a derivative of castor oil, containing at least one sulfonic acid group directly linked to a carbon atom which is obtainable by acting with fuming sulfonic acid on the castor oil.

In testimony whereof, I affix my signature.

FERDINAND MÜNZ.